United States Patent
Rhew et al.

(10) Patent No.: US 12,540,637 B1
(45) Date of Patent: Feb. 3, 2026

(54) CAM BOLT ASSEMBLY

(71) Applicant: GM Global Technology Operations LLC, Detroit, MI (US)

(72) Inventors: Choonghee Rhew, Incheon (KR); Jonghak Park, Gyeonggi-do (KR); Taeseok Kee, Incheon (KR); Jungwoo Yu, Seoul (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/949,515

(22) Filed: Nov. 15, 2024

(51) Int. Cl.
  *F16B 19/02* (2006.01)
  *B60G 3/20* (2006.01)
  *B60G 7/00* (2006.01)
  *B60G 7/02* (2006.01)

(52) U.S. Cl.
  CPC ............... *F16B 19/02* (2013.01); *B60G 3/20* (2013.01); *B60G 7/001* (2013.01); *B60G 7/02* (2013.01); *B60G 2200/144* (2013.01); *B60G 2204/143* (2013.01)

(58) Field of Classification Search
  CPC .......... F16B 19/02; B60G 3/20; B60G 7/001; B60G 7/02; B60G 2200/144; B60G 2204/143
  See application file for complete search history.

(56) References Cited

U.S. PATENT DOCUMENTS

| | | | |
|---|---|---|---|
| 5,044,659 A * | 9/1991 | Specktor | B62D 17/00 280/86.753 |
| 5,580,201 A | 12/1996 | Brilmyer | |
| 7,125,026 B2 * | 10/2006 | Genick, II | F16B 35/041 280/86.753 |
| 2005/0001397 A1 | 1/2005 | Genick, II | |
| 2023/0012004 A1 | 1/2023 | Ansalone et al. | |
| 2025/0100335 A1 | 3/2025 | Confalonieri | |

FOREIGN PATENT DOCUMENTS

DE 102020112831 A1 11/2021

* cited by examiner

*Primary Examiner* — Jason D Shanske
*Assistant Examiner* — Matthew James O'Neill
(74) *Attorney, Agent, or Firm* — Honigman LLP; Matthew H. Szalach; Jonathan P. O'Brien

(57) ABSTRACT

A cam bolt assembly comprising a bolt having a first end and a second end spaced from the first end with respect to a bolt axis. The bolt includes a first groove and a second groove spaced from the first groove with respect to the bolt axis, a first cam coupled to the bolt, a second cam coupled to the bolt, a first key arranged in the first cam and selectively engageable with the first groove, and a second key arranged in the second cam and selectively engageable with the second groove.

20 Claims, 10 Drawing Sheets

CAM BOLT ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle and, more particularly, to a fastener assembly for a suspension.

Wheel alignment of a vehicle is a critical aspect that ensures the vehicle travels straight and evenly down a road. Proper alignment can lead to several benefits, including even tire wear, reduced strain on steering and suspension components, and improved fuel efficiency. The primary angles that are adjusted to achieve optimal wheel alignment are toe, camber, and caster. However, in all-wheel-drive electric vehicles or all-wheel-drive plug-in hybrid vehicles, one or more electric drive modules can create significant spatial constraints for traditional cam bolts used for camber adjustments, which can make package design challenging and impact performance. Shortcomings of existing vehicles will be addressed by one or more aspects of the present disclosure.

SUMMARY

In one configuration, a cam bolt assembly is provided and includes a cam bolt assembly, including a bolt having a first end and a second end spaced from the first end with respect to a bolt axis, the bolt including a first groove and a second groove spaced from the first groove with respect to the bolt axis. The cam bolt assembly further includes a first cam coupled to the bolt, a second cam coupled to the bolt, a first key arranged in the first cam and selectively engageable with the first groove, and a second key arranged in the second cam and selectively engageable with the second groove.

The cam bolt assembly may include one or more of the following optional aspects. For example, the bolt can further include a shaft extending between the first end and the second end, a threaded portion at the second end, a bolt head coupled to the shaft at the first end, the first groove being arranged between the second end and the threaded portion with respect to the bolt axis, and the second groove being arranged between the threaded portion and the bolt head with respect to the bolt axis. The bolt head can include an indicator, the first groove, the second groove, and may be arranged axially and circumferentially with respect to the bolt axis. The second cam can include a threaded nut that corresponds with the threaded portion of the bolt.

According to at least one aspect, the first cam and the second cam can further include a through hole extending along a central axis and a keyhole extending along a keyhole axis, the keyhole axis being perpendicular to the central axis. The first key can be arranged in the keyhole of the first cam and can be configured to move along the keyhole axis of the first cam. The second key can be arranged in the keyhole of the second cam and can be configured to move along the keyhole axis of the second cam.

According to another aspect, the first key and the second key can each further include a base, a pin coupled to the base, and one or more wings coupled to the base. The base of the first key can be configured to engage with the first groove and the base of the second key can be configured to engage with the second groove. The base of the first key and the base of the second key can each include a rounded engagement surface.

According to at least one example, the first cam and the second cam each include an inner surface, an outer surface, a perimeter surface between the inner surface and the outer surface, and a through hole extending through the inner surface and the outer surface along a central axis.

In another configuration, a vehicle suspension is provided and includes a vehicle frame, a brake corner spaced from the vehicle frame with respect to a lateral axis, a lower control arm coupled to the brake corner and the vehicle frame, an upper control arm coupled to the brake corner and the vehicle frame, and a cam bolt assembly coupled to the lower control arm and the brake corner. The cam bolt assembly includes a bolt having a first end and a second end spaced from the first end with respect to a bolt axis, a first cam coupled to the bolt, a second cam coupled to the bolt, a first key arranged in the first cam and selectively engageable with the bolt, and a second key arranged in the second cam and selectively engageable with the bolt.

The cam bolt assembly may include one or more of the following optional aspects. For example, the first cam and the second cam can be configured to engage with a portion of the vehicle frame and move the lower control arm with respect to the lateral axis. The first cam and the second cam include a first position with respect to the bolt axis. The brake corner includes a first camber based on the first position. The first cam and the second cam include a second position with respect to the bolt axis and the brake corner includes a second camber based on the second position. The first cam and the second cam include a third position with respect to the bolt axis. The brake corner includes a third camber based on the third position.

In another configuration, a vehicle is provided and includes a vehicle body, a vehicle frame coupled to the vehicle body, a vehicle suspension coupled to the vehicle frame. The vehicle suspension includes at least one wheel spaced from the vehicle frame with respect to a lateral axis, a control arm coupled to the at least one wheel and the vehicle frame, and a cam bolt assembly coupled to the control arm and the vehicle frame. The cam bolt assembly includes a bolt having a first end and a second end spaced from the first end with respect to a bolt axis, a first cam coupled to the bolt, a second cam coupled to the bolt, a first key arranged in the first cam and selectively engageable with the bolt, and a second key arranged in the second cam and selectively engageable with the bolt.

The vehicle may include one or more of the following optional aspects. For example, the first cam and the second cam may be configured to engage with a portion of the vehicle frame and move the control arm with respect to the lateral axis. The first cam and the second cam can include a first position with respect to the bolt axis. The wheel includes a first camber based on the first position. The first cam and the second cam include a second position with respect to the bolt axis. The wheel includes a second camber based on the second position. The first cam and the second cam include a third position with respect to the bolt axis. The wheel includes a third camber based on the third position.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
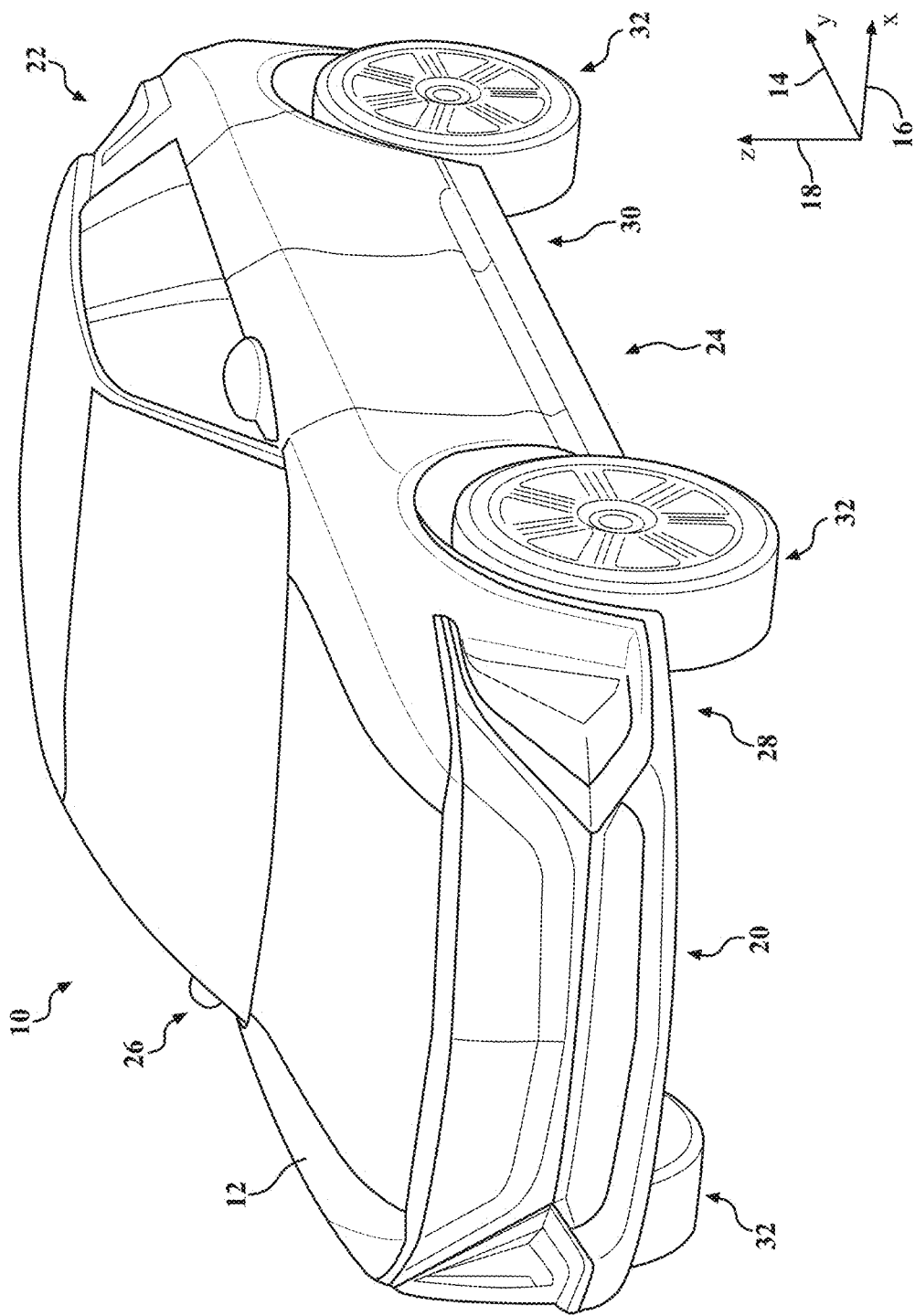
FIG. 1 is a front perspective view of a vehicle according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, a vehicle 10, such as an electric motor vehicle, is provided. The vehicle 10 includes a vehicle body 12 extending along a first or longitudinal axis (i.e., fore-aft direction) 14, a second or lateral axis (i.e., cross-car direction) 16, and a third or vertical axis 18. The vehicle body 12 can include a first or front end 20, a second or rear end 22 spaced from the front end 20 with respect to the longitudinal axis 14, a first or left side 24, and a second or right side 26 spaced from the left side 24 with respect to the lateral axis 16. The vehicle 10 includes a suspension that has a front suspension 28 arranged towards the front end 20 and a rear suspension 30 (FIG. 2) arranged towards the rear end 22. One or more wheels 32 can be coupled to the front suspension 28 and the rear suspension 30.

Figure 2:
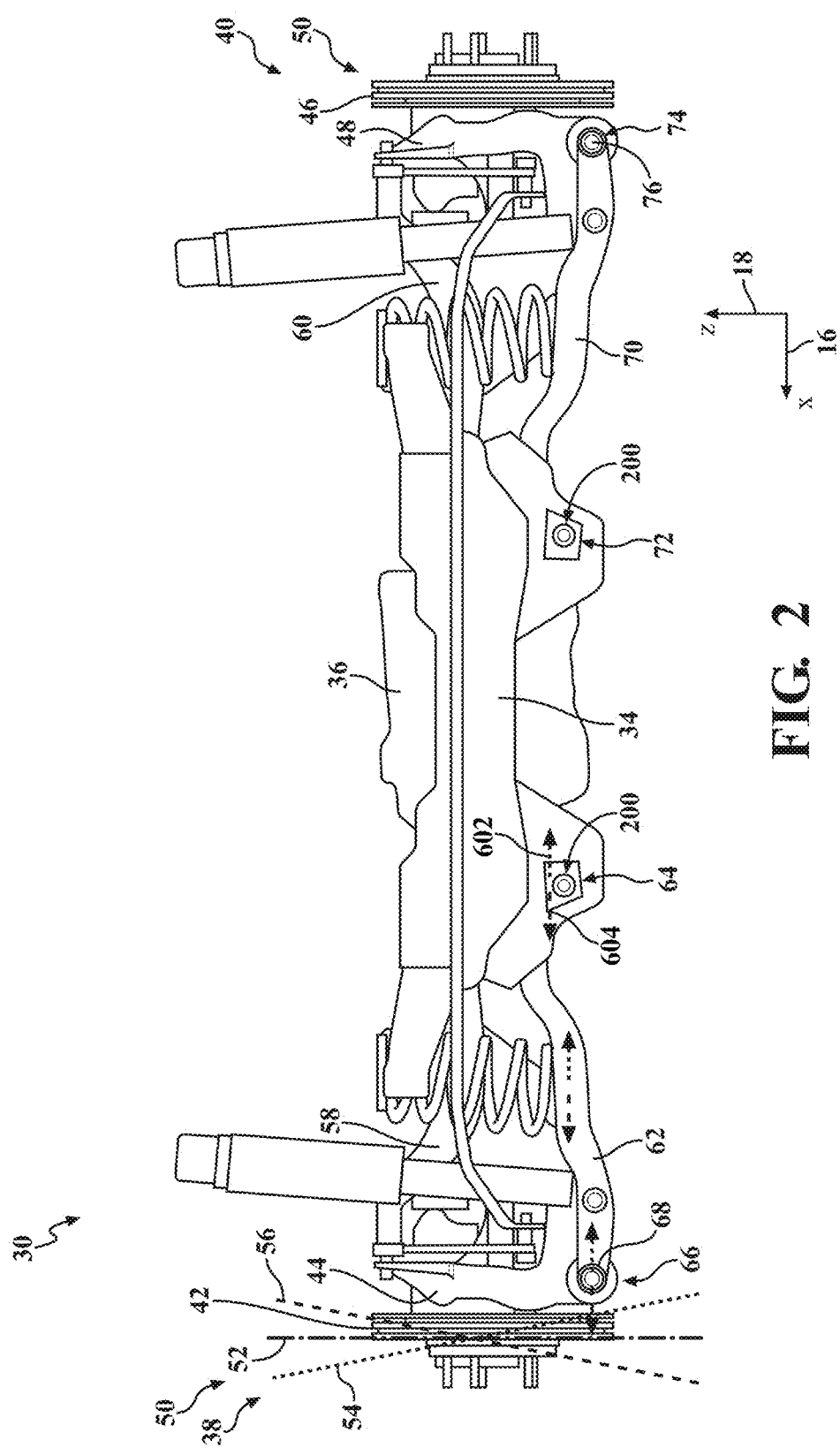
FIG. 2 is a rear view of a rear suspension of the vehicle of FIG. 1.

With reference to FIG. 2, the rear suspension 30 is shown coupled to a portion of a vehicle frame 34 that extends between the rear end 22 and the front end 20 (FIG. 1). A rear drive unit 36 can be arranged on, attached to, or otherwise coupled to a portion of the vehicle frame 34, as shown in FIG. 2. The rear drive unit 36 can be communicatively coupled to the one or more wheels 32 and configured to propel the one or more wheels 32. The rear suspension 30 includes a first or left brake corner 38 and a second or right brake corner 40 spaced from the left brake corner 38 with respect to the lateral axis 16. The left brake corner 38 includes a first or left rotor 42 coupled to a first or left steering knuckle 44 and the right brake corner 40 includes a second or right rotor 46 coupled to a second or right steering knuckle 48. The left brake corner 38 and the right brake corner 40 can each be arranged with a camber 50. For purposes of the present illustrative configuration, camber 50 can refer to an angle formed between a vertical axis of one of the one or more wheels 32 (FIG. 1) and the vertical axis 18 of the vehicle 10 when viewed from the front end 20 or the rear end 22. As will be discussed in greater detail below, the rear suspension 30 can be manipulated so that that left brake corner 38 and/or the right brake corner 40 has a first or neutral camber 52, a second or positive camber 54, or a third or negative camber 56.

With continued reference to FIG. 2, the rear suspension 30 includes one or more upper control arms and one or more lower control arms. For instance, a left upper control arm 58 is coupled to the left steering knuckle 44 and a portion of the vehicle frame 34 and a right upper control arm 60 is coupled to the right steering knuckle 48 and a portion of the vehicle frame 34. A left lower control arm 62 includes an inner bushing 64 and an outer bushing 66 spaced from the inner bushing 64. The outer bushing 66 can be coupled to the left steering knuckle 44 with a fastener 68 and the inner bushing 64 can be coupled to a portion of the vehicle frame 34 with a cam bolt assembly 200. Similarly, a right lower control arm 70 includes an inner bushing 72 and an outer bushing 74 spaced from the inner bushing 72. The outer bushing 74 can be coupled to the right steering knuckle 48 with a fastener 76 and the inner bushing 64 can be coupled to a portion of the vehicle frame 34 with the cam bolt assembly 200.

Figure 3:
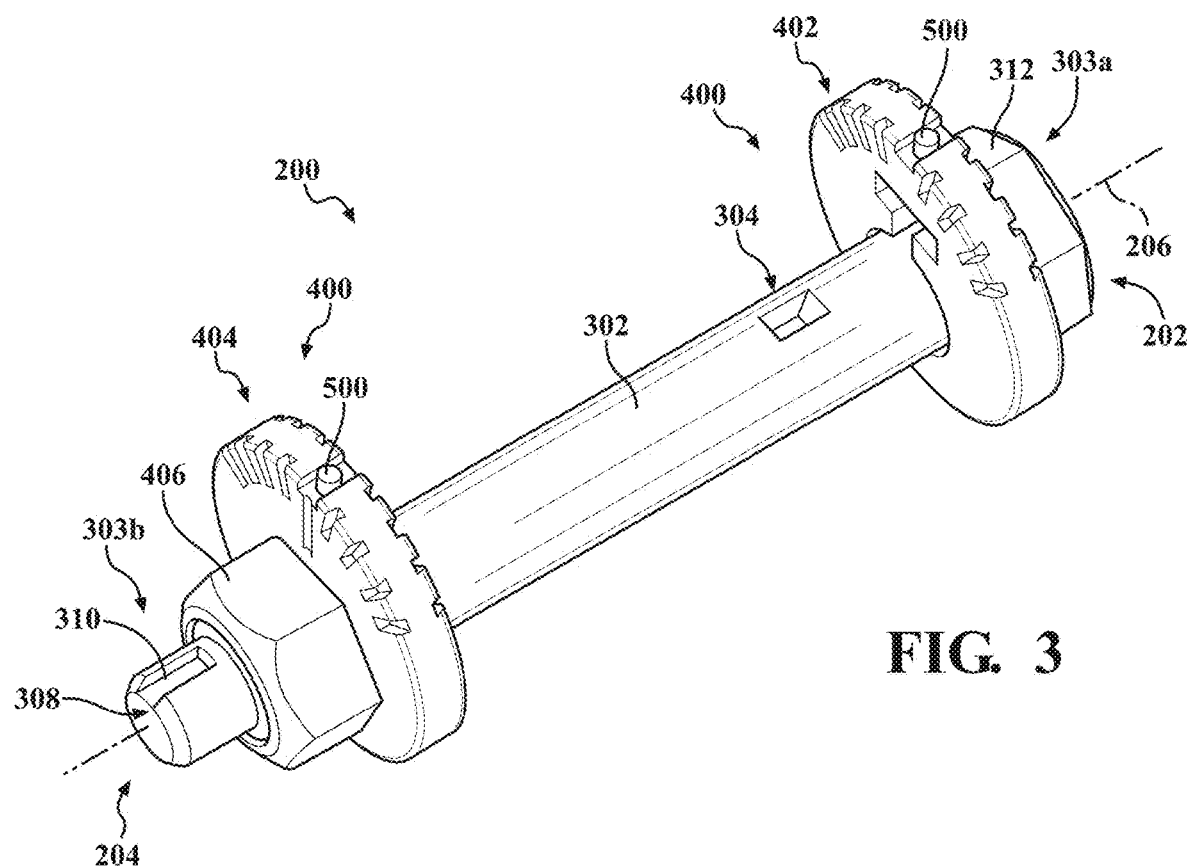
FIG. 3 is a top perspective view of a cam bolt assembly according to principles of the present disclosure.

With reference to FIG. 3, the cam bolt assembly includes a first end 202 and a second end 204 spaced from the first end 202 with respect to a bolt axis 206. The cam bolt assembly 200 can be configured to adjust, modify, and/or tune one or more aspects of the suspension of the vehicle 10. In the present illustrative configuration, the cam bolt assembly 200 includes a bolt 300, one or more cams 400 arranged on the bolt 300, and one or more keys 500 arranged between the bolt 300 and the one or more cams 400.

Figure 4:
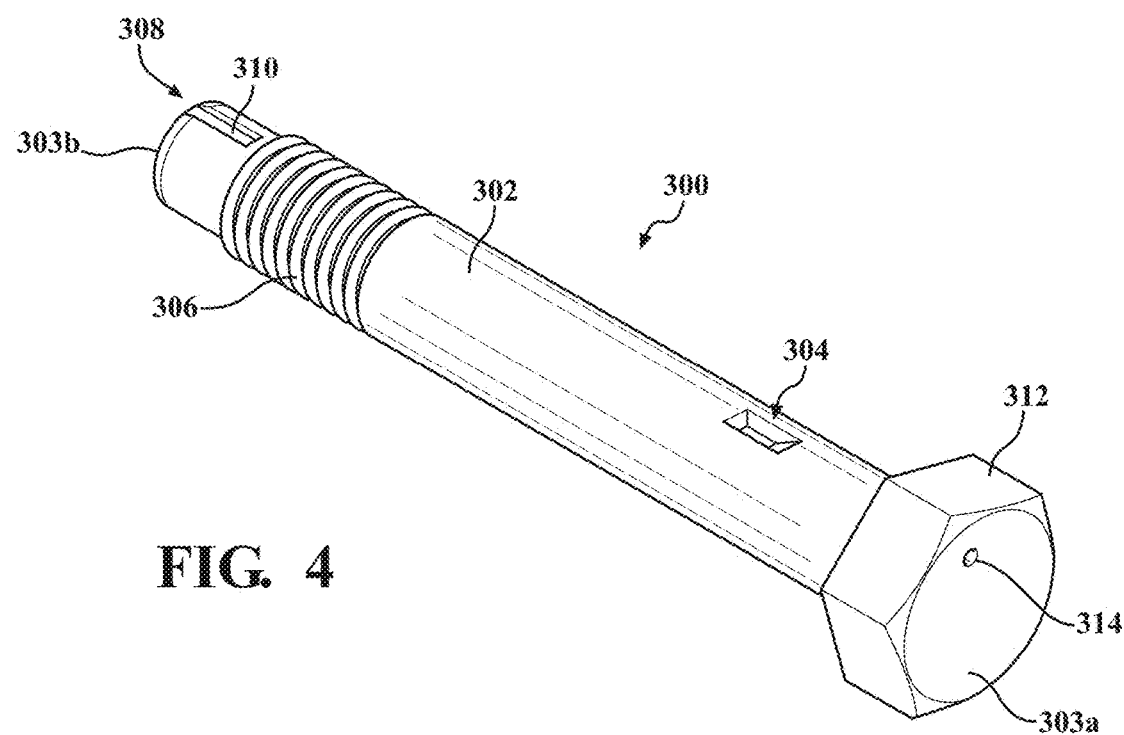
FIG. 4 is a perspective view of a bolt of the cam bolt assembly of FIG. 3.

With reference to FIGS. 3 and 4, the bolt 300 includes a shaft 302 extending between a first end 303a and a second end 303b with respect to the bolt axis 206. The shaft 302 includes one or more grooves or notches between the first end 303a and the second end 303b. For instance, a first groove 304 can be arranged between a threaded portion 306 and the first end 202 and a second groove 308 can be arranged between the threaded portion 306 and the second end 204. The first groove 304 can include a drive-on surface 310 that forms an angle with the bolt axis 206. As will be discussed in greater detail below, the drive-on surface 310 can be desirable for arranging the one or more cams 400 on the bolt 300. The bolt 300 further includes a head 312 coupled to the shaft 302 at the first end 202. The head 312 can be a hexagon or another shape commonly used in the automotive industry, for example. With reference to FIG. 4, the head 312 can include an indicator 314 that is axially aligned with the first groove 304 and the second groove 308.

Figure 5A:
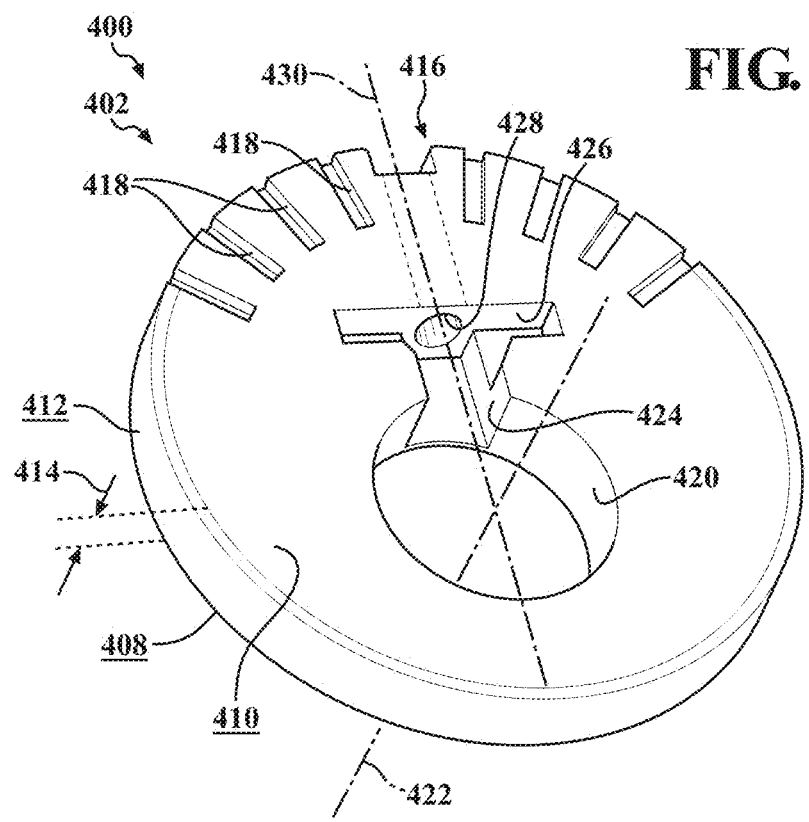
FIG. 5A is a rear perspective view of a cam washer of the cam bolt assembly of FIG. 3.
Figure 5B:
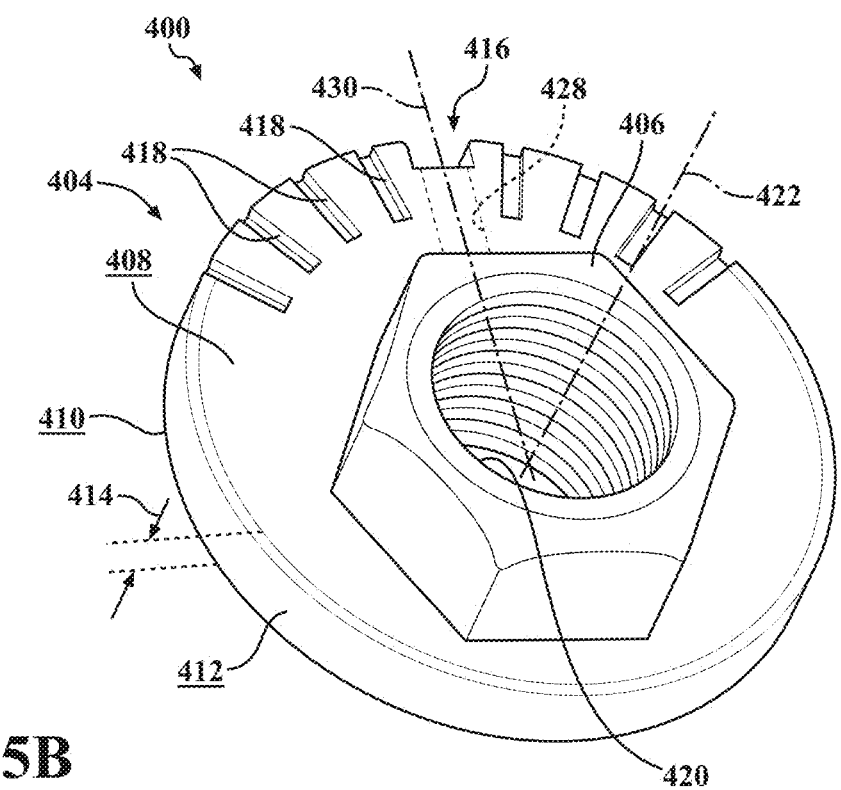
FIG. 5B is a rear perspective view of cam nut of the cam bolt assembly of FIG. 3.

The one or more cams (hereinafter, the cam or cams) 400 can include a cam washer 402 (FIG. 5A) and a cam nut 404 (FIG. 5B). The cam washer 402 and the cam nut 404 are similar with the exception that the cam nut 404 further includes a threaded nut 406 that corresponds with the threaded portion 306 of the bolt 300. The cams 400 each include a first or outer surface 408 and a second or inner surface 410 spaced from the outer surface 408. The cams 400 include a perimeter surface 412 arranged between the outer surface 408 and the inner surface 410. The perimeter surface 412 also defines a thickness 414 between the outer surface 408 and the inner surface 410. The cams 400 can also include a flag window 416 that extends from the inner surface 410 through the outer surface 408. One or more notches 418 can extend from the inner surface 410, through a portion of the perimeter surface 412, and to the outer surface 408 and can be arranged circumferentially on either side of the flag window 416, for example. The one or more notches 418 can be desirable for creating traction between the cams 400 and a portion of the vehicle frame 34 when manipulating and/or assembling the suspension, for example. Additionally, or alternatively, the one or more notches 418 can help indicate which direction the cam assembly 200 is rotated with respect to the bolt axis 206.

With continued reference to FIG. 5B, the cams 400 can each include a through hole 420 that extends through the outer and inner surfaces 408, 410 along a central axis 422. According to one aspect, the through hole 420 is offset from a center of the cams 400. In other words, the distance between the perimeter surface 412 and the central axis 422 is not consistent around the perimeter of the cams 400. This is desirable so that the cams 400 can transform rotary motion into linear motion, for example. The through hole 420 can be configured so that the cams 400 can easily traverse along the shaft 302 of the bolt 300. A first channel 424 extends from the inner surface 410 toward the outer surface 408 and between the through hole 420 and the perimeter surface 412. A second channel 426 extends from the inner surface 410 toward the outer surface 408 and is arranged perpendicular to the first channel 424. A keyhole 428 can extend from the second channel 426 through the perimeter surface 412 along a keyhole axis 430 that is perpendicular to the central axis 422. In the present illustrative configuration, the keyhole 428 opens to the flag window 416. As will be discussed in more detail below, one of the one or more keys 500 can be arranged in the keyhole 428 of each of the cams 400 and can be movable along the keyhole axis 430 so that a portion of the key 500 can extend into the flag window 416.

With reference to FIG. 5B, the threaded nut 406 can be arranged coaxially with the through hole 420 and coupled to or otherwise attached to the outer surface 408. The threaded nut 406 can have a hexagonal shape or another shape commonly used in the automotive industry, for example.

Figure 6A:
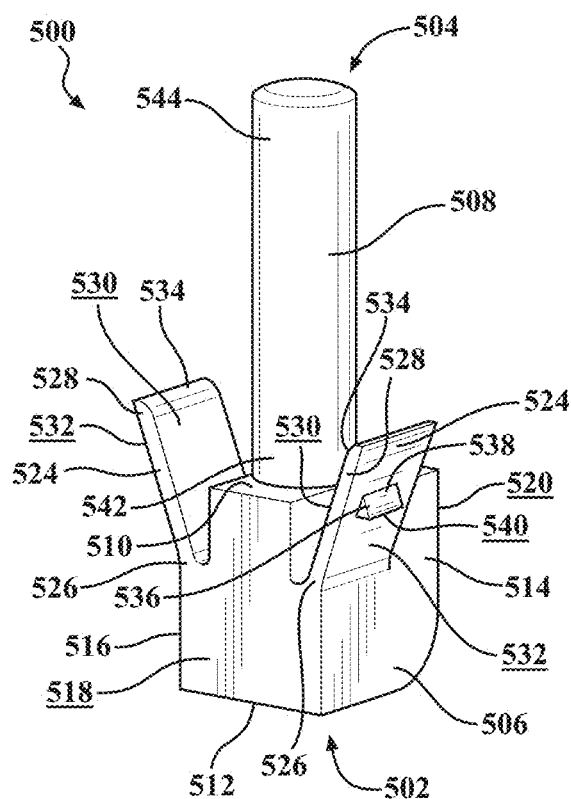
FIG. 6A is a front perspective view of a key of the cam bolt assembly of FIG. 3.

With reference to FIG. 6A, the one or more keys 500 (hereinafter, the key or keys) can be configured to engage with both the bolt 300 and the one or more cams 400. The keys 500 can include a first end 502 and a second end 504 spaced from the first end 502. The keys 500 each include a base 506 arranged at the first end 502 and a pin 508 coupled to the base 506 and extending to the second end 504. More particularly, the base 506 includes an upper end 510, a lower end 512 spaced from the upper end 510, a first side 514 extending between the upper end 510 and the lower end 512, and a second side 516 extending between the upper end 510 and the lower end 512. Additionally, the base 506 includes a first surface 518 and a second surface 520 opposite the first surface 518 that each extend between the upper end 510, the lower end 512, the first side 514, and the second side 516. The second surface 520 can include a rounded segment 522 so that the base 506 can easily engage and disengage with a portion of the bolt 300. One or more wings 524 are coupled to the first and second sides 514, 516 of the base 506 and extend away from the base 506 toward the second end 504. More particularly, the one or more wings 524 each include a first or proximal end 526 coupled to the base 506 and a distal end 528 spaced from the proximal end 526. The one or more wings 524 are cantilevered with respect to the base 506 and are configured to flex away from the pin 508. The one or more wings 524 each include an inner surface 530 and an outer surface 532 opposite the inner surface 530. Each inner surface 530 can extend between the proximal end 526 and the distal end 528 and include a rounded engagement surface 534 that is configured to engage with a portion of the second channel 426 of one of the cams 400, for example. Each outer surface 532 can also extend between the proximal end 526 and the distal end 528. One or more teeth or stoppers 536 can be coupled to the outer surfaces 532 and extend away from the one or more wings 524. With reference to FIG. 6A, the one or more stoppers 536 each include a drive-on surface 538 and a retainer surface 540. The one or more retainer surfaces 540 are configured to engage with a portion of the second channel 426 and limit axial movement with respect to the keyhole axis 430.

Figure 6B:
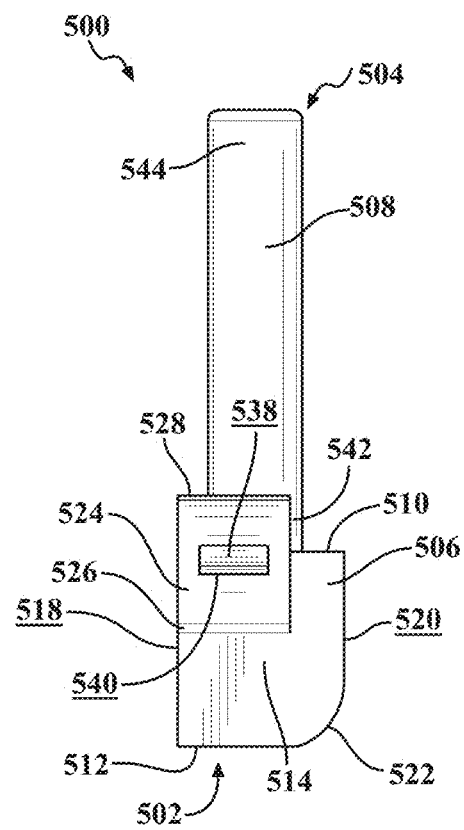
FIG. 6B is a side view of the key of FIG. 6A.

With reference to FIGS. 6A and 6B, the pin 508 can include a first end 542 coupled to the upper end 510 of the base 506 and a second end 544 spaced from the first end 542. The pin 508 can include a cylindrical shape or another shape that corresponds with the keyhole 428, for example.

Figure 7A:
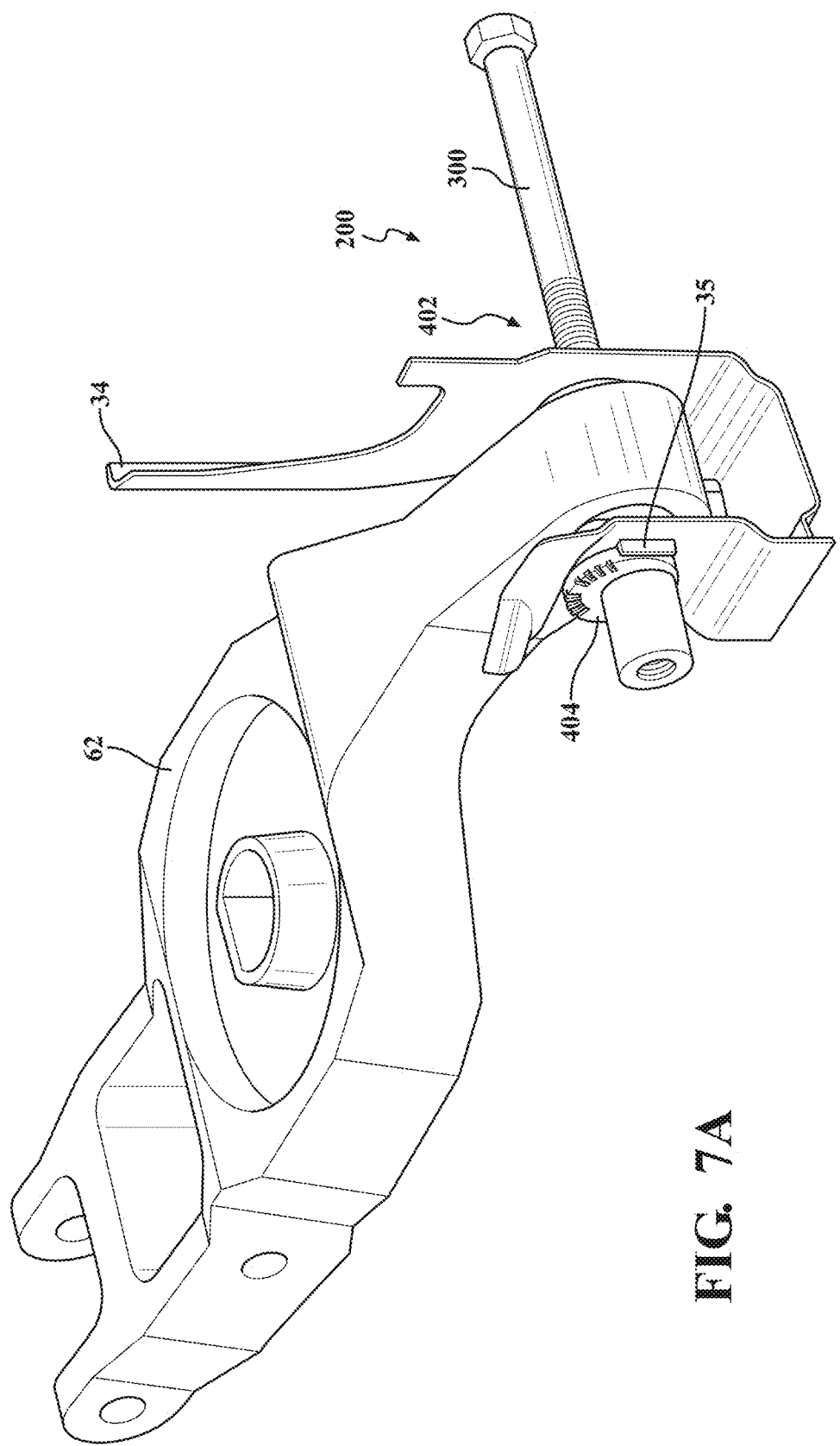
FIG. 7A is a rear perspective view of a left lower control arm and the cam bolt assembly of FIG. 3.

With reference to FIG. 7A, an illustrative example of the cam bolt assembly 200 being arranged in the left lower control arm 62 and a portion of the vehicle frame 34 is provided. In the present illustrative configuration, the vehicle frame 34 includes guides 35 that are coupled or otherwise attached to the vehicle frame 34 and configured to correspond with the cam washer 402 (FIG. 5A) and the cam nut 404. As will be discussed in greater detail below, with respect to FIGS. 9C, 9D, and 9E, the guides 35 can include opposing surfaces 35a, 35b that the cam washer 402 (FIG. 5A) and the cam nut 404 can contact.

Figure 7B:
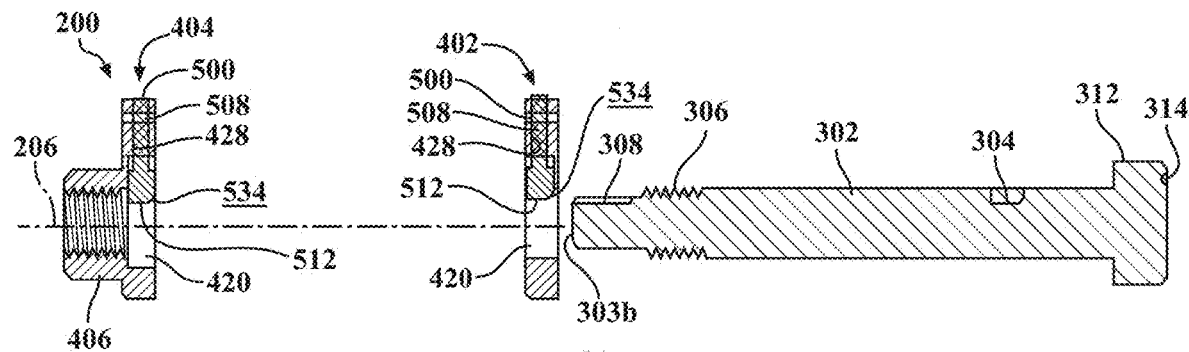
FIG. 7B is a cross-sectional view of the cam bolt assembly of FIG. 3 including a bolt removed from a cam washer and a cam nut.

In assembly, with reference to FIG. 7B, the keys 500 are arranged in the keyholes 428 of the cam washer 402 and the cam nut 404 and the shaft 302 is aligned with the central axis 422 of the cams 400. More particularly, the keys 500 can be arranged in the cam washer 402 and the cam nut 404 so that the rounded engagement surfaces 534 face the head 312 of the bolt 300.

Figure 8A:
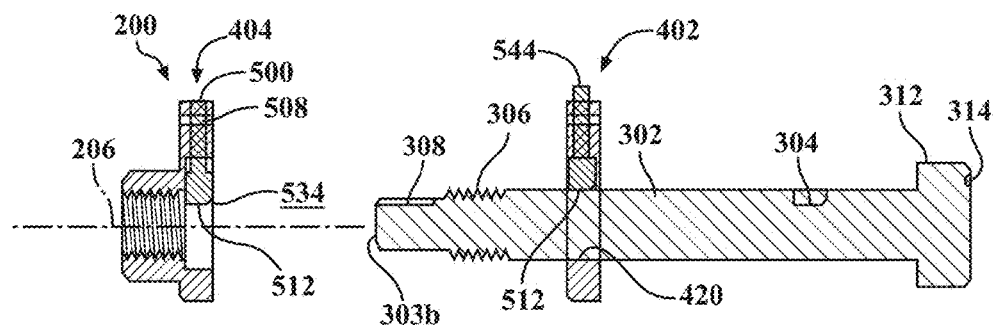
FIG. 8A is a cross-sectional view of the cam bolt assembly of FIG. 3 including the bolt being inserted into the cam washer.
Figure 8B:
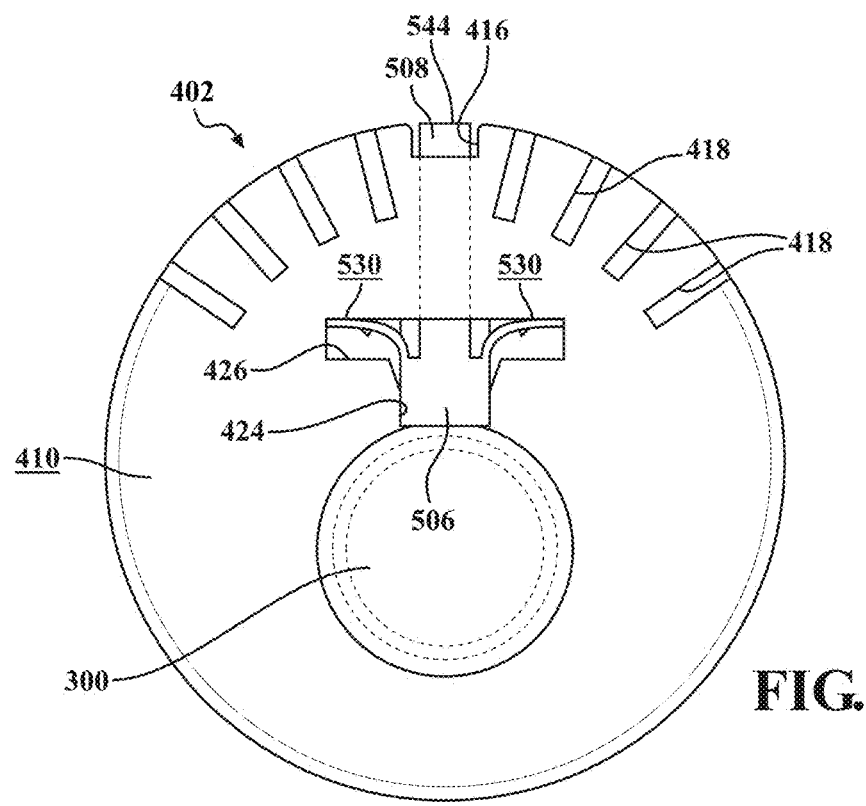
FIG. 8B is a rear view of the cam washer of FIG. 8A.

In assembly, with reference to FIGS. 8A and 8B, a user, machine, and/or tool can advance the bolt 300 along the bolt axis 206 so that the key 500 arranged in the cam washer 402 contacts the shaft 302 and moves axially with respect to the keyhole axis 430 (FIG. 5A). The second end 504 of the pin 508 extends into the flag window 416, which indicates to a user or operator that the key 500 is not arranged in the first groove 304. Additionally, the inner surfaces 530 of the one or more wings 524 contact the second channel 426 so that the key 500 in the cam washer 402 is in a loaded position.

Figure 9A:
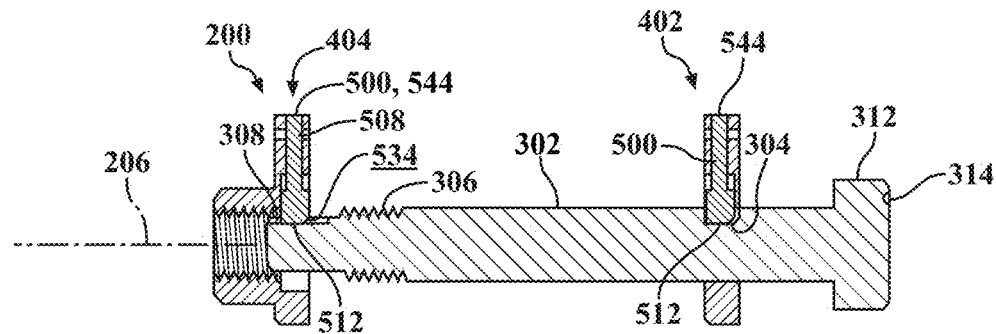
FIG. 9A is a cross-sectional view of the cam bolt assembly of FIG. 3 including a first key arranged in a first groove of the bolt and a second key arranged in a second groove of the bolt.
Figure 9B:
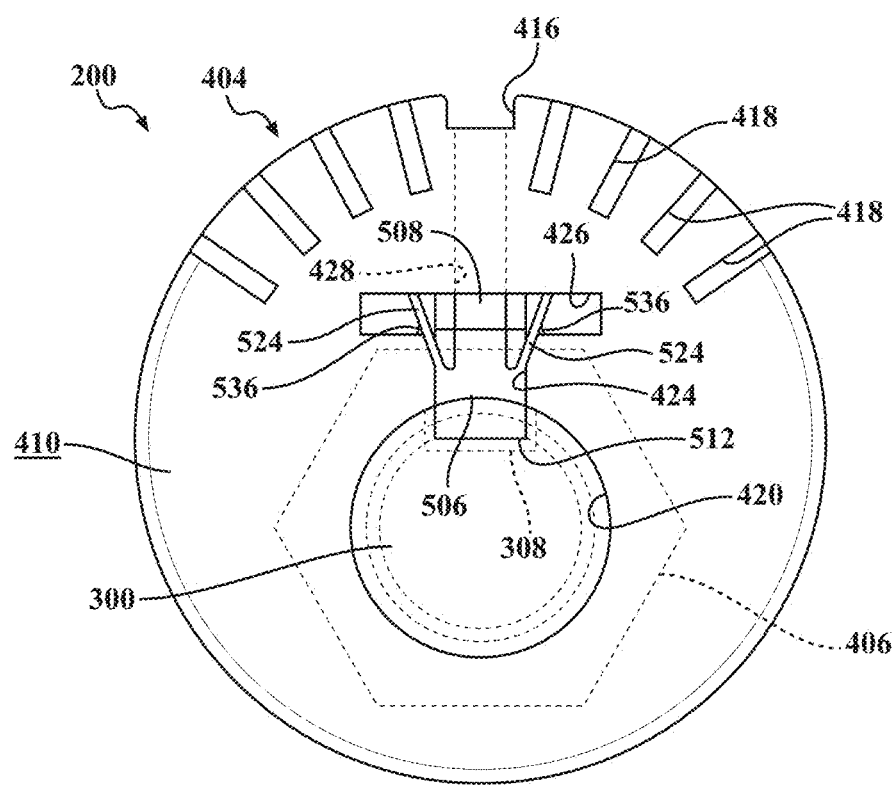
FIG. 9B is a front view of the cam nut of FIG. 9A.

In assembly, with reference to FIGS. 9A and 9B, a user, machine, and/or tool can advance the bolt 300 along the bolt axis 206 so that the key 500 arranged in the cam washer 402 is arranged in the first groove 304 and the key 500 arranged in the cam nut 404 is arranged in the second groove 308. As shown in FIG. 9A, the second ends 544 of the pins 508 do not protrude into the flag windows 416 of the cams 400, which indicates to a user or operator that the keys 500 are arranged in the grooves 304, 308 of the bolt 300.

Figure 9C:
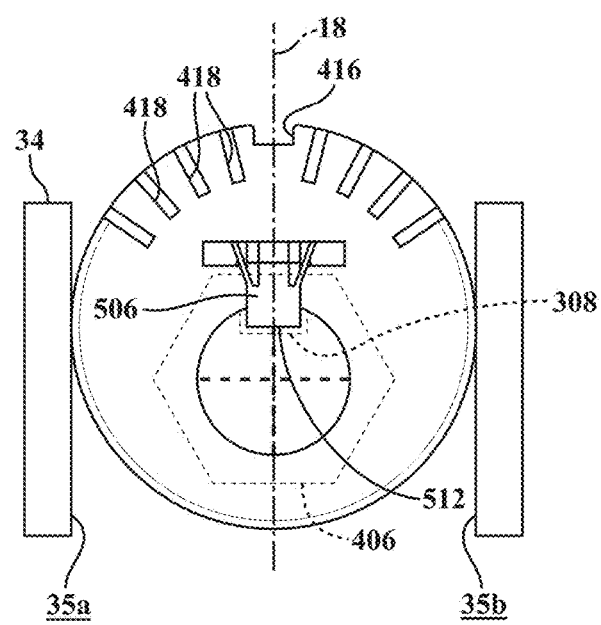
FIG. 9C is a front view of the cam nut of FIG. 9A arranged in a first position.
Figure 9D:
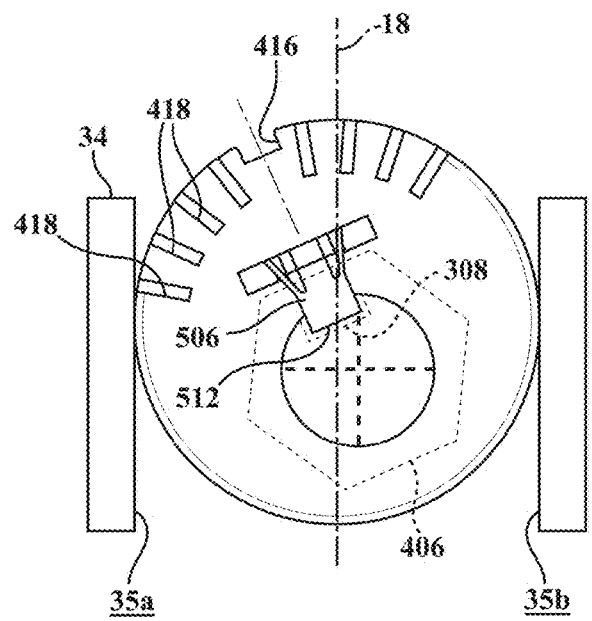
FIG. 9D is a front view of the cam nut of FIG. 9A arranged in a second position.
Figure 9E:
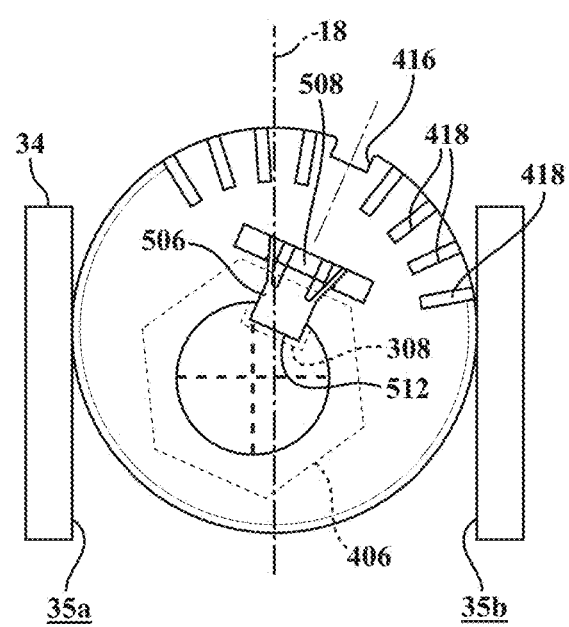
FIG. 9E is a front view of the cam nut of FIG. 9B arranged in a third position.

With reference to FIGS. 9C, 9D, and 9E, before the bolt 300 is advanced with respect to the bolt axis 206, a user or operator can rotate the cam bolt assembly 200 to contact the guides 35 on the vehicle frame 34 and adjust a portion of the vehicle suspension. More particularly, with reference to FIG. 2, the cam bolt assembly 200 can be rotated clockwise 602 or counterclockwise 602 from the first or neutral position (FIG. 9C) to adjust the camber of the brake corners 38, 40 and/or the one or more wheels 32 of the suspension. Note, the following description is provided with respect to the left brake corner 38 and the left lower control arm 62, however, the principles equally apply to other brake corners and control arms (i.e., front, rear, upper, lower, left, or right) of the vehicle 100. For instance, with reference to FIGS. 2 and 9D, rotating the cam bolt assembly 200 clockwise 602 to a first position (FIG. 9D) moves the left lower control arm 62 axially toward the rear drive unit 36, which results in the left steering knuckle 44 and/or the wheel 32 coupled to the left brake corner 38 to have the positive camber 54. With reference to FIGS. 2 and 9E, rotating the cam bolt assembly 200 counterclockwise 604 to a second position (FIG. 9E) moves the left lower control arm 62 axially away from the rear drive unit 36, which results in the left steering knuckle 44 and/or the wheel 32 coupled to the left brake corner 38 to have the negative camber 56.

Figure 10A:
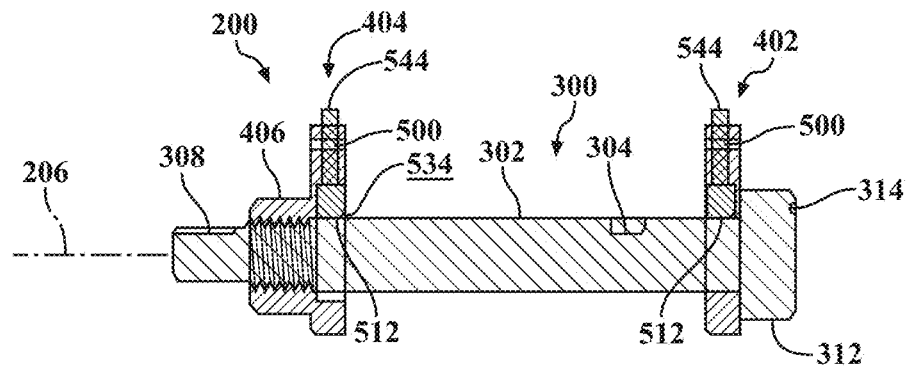
FIG. 10A is a cross-sectional view of the cam bolt assembly of FIG. 3 including a threaded portion of the bolt arranged in a threaded nut of the cam nut.
Figure 10B:
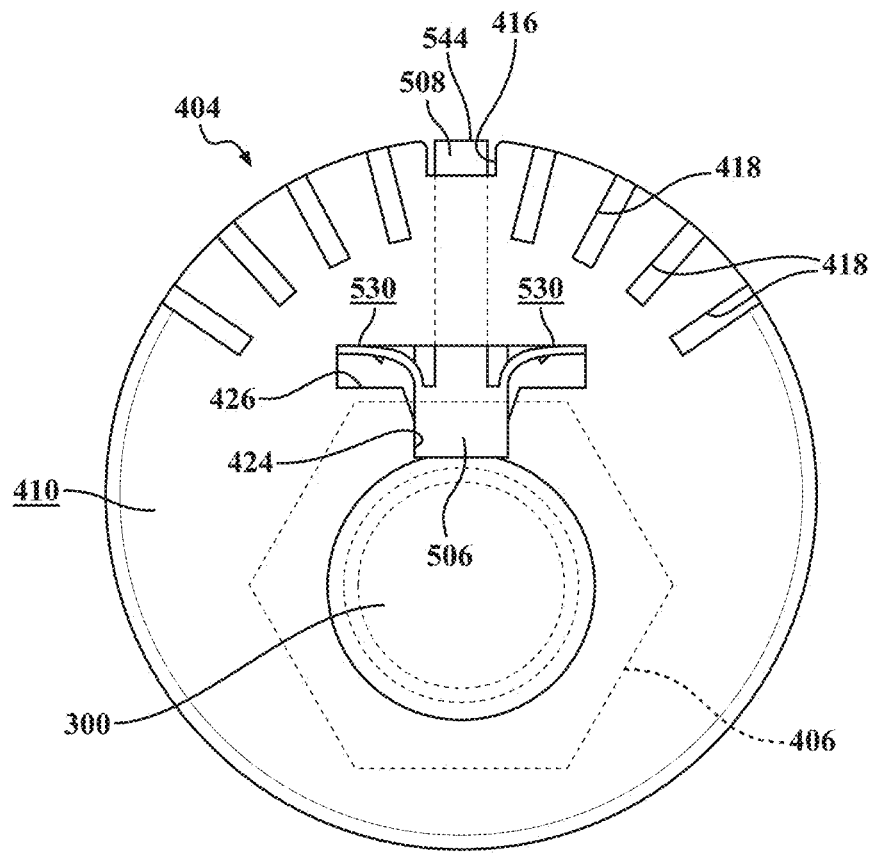
FIG. 10B is a front view of the cam nut of FIG. 10A.

With reference to FIG. 10A, the bolt 300 can be advanced with respect to the bolt axis 206 so that the threaded portion 306 contacts the threaded nut 406 of the cam nut 404. The user can fasten the threaded portion 306 to the threaded nut 406 to secure the position of the cam bolt assembly 200. As the bolt 300 is fastened to the threaded nut 406, with reference to FIG. 10B, the key 500 arranged in the cam nut 404 contacts the shaft 302 and moves axially with respect to the keyhole axis 430 (FIG. 5B). The second end 504 of the pin 508 extends into the flag window 416, which indicates to a user or operator that the key 500 is no longer arranged in the second groove 308. Additionally, the inner surfaces 530 of the one or more wings 524 contact the second channel 426 so that the key 500 in the cam nut 404 is in a loaded position.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A cam bolt assembly, comprising:
   a bolt having a first end and a second end spaced from the first end with respect to a bolt axis, the bolt including a first groove and a second groove spaced from the first groove with respect to the bolt axis;
   a first cam coupled to the bolt;
   a second cam coupled to the bolt;
   a first key arranged in the first cam and selectively engageable with the first groove; and
   a second key arranged in the second cam and selectively engageable with the second groove.

2. The cam bolt assembly of claim 1, wherein the bolt further includes:
   a shaft extending between the first end and the second end,
   a threaded portion at the second end,
   a bolt head coupled to the shaft at the first end, the first groove being arranged between the second end and the threaded portion with respect to the bolt axis, and the second groove being arranged between the threaded portion and the bolt head with respect to the bolt axis.

3. The cam bolt assembly of claim 2, wherein the bolt head includes an indicator, the first groove, the second groove, and the indicator being arranged axially with respect to the bolt axis.

4. The cam bolt assembly of claim 2, wherein the second cam includes a threaded nut that corresponds with the threaded portion of the bolt.

5. The cam bolt assembly of claim 1, wherein the first cam and the second cam further include:
a through hole extending along a central axis, and
a keyhole extending along a keyhole axis, the keyhole axis being perpendicular to the central axis.

6. The cam bolt assembly of claim 5, wherein the first key is arranged in the keyhole of the first cam and is configured to move along the keyhole axis of the first cam and the second key is arranged in the keyhole of the second cam and is configured to move along the keyhole axis of the second cam.

7. The cam bolt assembly of claim 1, wherein the first key and the second key each further include:
a base,
a pin coupled to the base, and
one or more wings coupled to the base.

8. The cam bolt assembly of claim 7, wherein the base of the first key is configured to engage with the first groove and the base of the second key is configured to engage with the second groove.

9. The cam bolt assembly of claim 7, wherein the base of the first key and the base of the second key each include a rounded engagement surface.

10. The cam bolt assembly of claim 1, wherein the first cam and the second cam each comprise:
an inner surface,
an outer surface,
a perimeter surface between the inner surface and the outer surface, and
a through hole extending through the inner surface and the outer surface along a central axis.

11. A vehicle suspension, comprising:
a vehicle frame;
a brake corner spaced from the vehicle frame with respect to a lateral axis;
a lower control arm coupled to the brake corner and the vehicle frame;
an upper control arm coupled to the brake corner and the vehicle frame; and
a cam bolt assembly coupled to the lower control arm and the brake corner, comprising:
a bolt having a first end and a second end spaced from the first end with respect to a bolt axis,
a first cam coupled to the bolt,
a second cam coupled to the bolt,
a first key arranged in the first cam and selectively engageable with the bolt, and
a second key arranged in the second cam and selectively engageable with the bolt.

12. The vehicle suspension of claim 11, wherein the first cam and the second cam are configured to engage with a portion of the vehicle frame and move the lower control arm with respect to the lateral axis.

13. The vehicle suspension of claim 12, wherein the first cam and the second cam include a first position with respect to the bolt axis and the brake corner includes a first camber based on the first position.

14. The vehicle suspension of claim 13, wherein the first cam and the second cam include a second position with respect to the bolt axis and the brake corner includes a second camber based on the second position.

15. The vehicle suspension of claim 14, wherein the first cam and the second cam include a third position with respect to the bolt axis and the brake corner includes a third camber based on the third position.

16. A vehicle, comprising:
a vehicle body;
a vehicle frame coupled to the vehicle body;
a vehicle suspension coupled to the vehicle frame, comprising:
at least one wheel spaced from the vehicle frame with respect to a lateral axis,
a control arm coupled to the at least one wheel and the vehicle frame, and
a cam bolt assembly coupled to the control arm and the vehicle frame, comprising:
a bolt having a first end and a second end spaced from the first end with respect to a bolt axis,
a first cam coupled to the bolt,
a second cam coupled to the bolt,
a first key arranged in the first cam and selectively engageable with the bolt, and
a second key arranged in the second cam and selectively engageable with the bolt.

17. The vehicle of claim 16, wherein the first cam and the second cam are configured to engage with a portion of the vehicle frame and move the control arm with respect to the lateral axis.

18. The vehicle of claim 17, wherein the first cam and the second cam include a first position with respect to the bolt axis and the wheel includes a first camber based on the first position.

19. The vehicle of claim 18, wherein the first cam and the second cam include a second position with respect to the bolt axis and the wheel includes a second camber based on the second position.

20. The vehicle of claim 19, wherein the first cam and the second cam include a third position with respect to the bolt axis and the wheel includes a third camber based on the third position.

* * * * *